Patented Jan. 14, 1947

2,414,303

UNITED STATES PATENT OFFICE 2,414,303

RECOVERY OF CYSTEINE

Donald F. Holloway and Harland H. Young, Chicago, Ill., assignors to Industrial Patents Corporation, Chicago, Ill., a corporation of Delaware No Drawing. Application April 22, 1943,
Serial No. 484,122

7 Claims. (Cl. 260—529)

This invention relates to the recovery of cysteine and more particularly to the recovery of this material in the form of cysteine hydrochloride from materials such as keratin containing cystine.

In accordance with the process of the present invention materials containing cystine are treated with an aqueous solution of hydrochloric acid at elevated temperatures to hydrolyze the material and produce a soluble cystine hydrolysate which is then reduced in the hydrochloric acid solution to cysteine hydrochloride with a metal which reacts with the acid to produce hydrogen. In order to recover the cysteine hydrochloride from the solution, this solution is first substantially neutralized, preferably at a relatively low temperature, with a solid alkaline compound having very limited solubility in the solution. Such an alkali and low temperature are employed to prevent rendering any portion of the solution alkaline even locally as the cysteine is rapidly decomposed by alkalies, particularly at elevated temperatures. Excess solid alkaline compound along with any other insoluble materials in the solution are then filtered or otherwise removed from the solution in order to produce a solution free from insolubles and containing the cysteine hydrochloride. This solution also contains other soluble materials and the cysteine hydrochloride is then rendered capable of being precipitated from the solution by converting it into a mercaptide which is insoluble in substantially neutralized cold aqueous dilute solutions. This conversion is accomplished by adding an oxide or other compound of a metal which forms such an insoluble mercaptide with cysteine hydrochloride and reacting the same with the cysteine hydrochloride at elevated temperatures. Upon cooling and dilution with cold water the cysteine mercaptide is precipitated and can be filtered or otherwise removed in solid form from the solution. This precipitate can be washed so as to be substantially free of other compounds. By selecting a metal which forms an insoluble mercaptide and an even more insoluble sulfide, the metal may be removed from the mercaptide by treatment with hydrogen sulfide to form the sulfide of the metal and again liberating cysteine hydrochloride soluble in the solution, the preferred compound for forming the mercaptide being cuprous oxide. Upon removing of the insoluble sulfide from the solution by filtration or otherwise, a solution of substantially pure cysteine hydrochloride may be obtained. This solution may be concentrated by evaporation of water and substantially pure cysteine hydrochloride crystallized therefrom. In order to crystallize the desired compound entirely as to its hydrochloride it is sometimes advantageous to add varying amounts of hydrochlorid acid to the solutions before its final concentration.

It is therefore an object of the present invention to provide an improved process of recovering substantially pure cysteine from proteinaceous material containing cystine.

Another object of the invention is to provide a process for recovering cysteine from material containing cystine in which neutralization of acids employed in the process is accomplished without decomposition of cysteine.

Another object of the invention is to provide a process for recovering cysteine from material containing cystine which may be practiced on a large scale to produce commercial quantities of cysteine hydrochloride.

A further object of the invention is to provide a process for recovering cysteine from materials containing cystine in which decomposition of said cysteine is substantially prevented and improved yields obtained.

Another object of the invention is to provide a process for recovering cysteine from materials containing cystine in which the solutions containing cysteine are substantially neutralized in order to provide for the precipitation of a mercaptide of the cysteine without at any time rendering said solution alkaline even locally.

A further object of the invention is to provide a process for recovering cysteine from materials containing cystine in which the acid employed to hydrolyze the cystine is neutralized with an alkali substantially insoluble in the solution to prevent rendering the solution alkaline.

A still further object of the invention is to provide a process for recovering cystine from materials containing cystine in which a cystine hydrolysate is reduced to cysteine hydrochloride in an acid solution at elevated temperatures without substantial decomposition of said cysteine.

As a specific example of recovery of substantially pure cysteine hydrochloride in crystal form from a keratin material such as hair, 1000 pounds of air dried hog hair is secured from a dehairing machine. The hog hair is then hydrolyzed by boiling with 2.2 times its weight, namely 2200 pounds of 20 per cent hydrochloric acid until the biuret test is negative, which usually takes from five to seven hours. A solution containing soluble cystine as well as other soluble material is produced also containing a large amount of insoluble residue from the hair. The solution containing the hydrolysate is filtered while hot to remove the insoluble matter since the presence of such insoluble matter tends to cause decomposition of the cysteine and reduces the yield unless removed prior to the reduction of the cystine containing hydrolysate to cysteine hydrochloride. The filtrate is then treated at about 85° C. with sufficient granulated zinc to substantially completely reduce the cystine hydrolysate to cysteine hydrochloride. Approximately 100 pounds of granulated zinc is required, that is to say, about 10 per cent zinc on the basis of the weight of the hair entering the process. Reduction proceeds rapidly and is substantially completed by the time the zinc has reacted with the hydrochloric acid. Upon completion of the reduction, the solution is allowed to cool to room temperature and ice is added to bring the solution to substantially 0° C. Ground limestone is then added in excess to substantially completely neutralize the hydrochloric acid, approximately 500 pounds of limestone being required. The mixture is then filtered to remove the excess limestone resulting in a solution containing cysteine hydrochloride and other soluble material such as other soluble proteinaceous material, zinc chloride and calcium or magnesium chloride, or both.

The solution from the above neutralizing step is then heated to substantially the boiling point, cuprous oxide added and then the mixture boiled to react the cuprous oxide with the cysteine hydrochloride to form a mercaptide of the cysteine hydrochloride which is soluble in the hot substantially neutralized solution but insoluble in a cold dilute substantially neutralized solution. Approximately 125 pounds of cuprous oxide is required for this reaction, that is to say, approximately 12.5 per cent on the basis of the hair used in the process. After the reaction with cuprous oxide has been substantially completed, the mixture is diluted to approximately five times its volume with cold water, resulting in a light gray precipitate of the mercaptide and a small amount of other insoluble copper salts of amino acids in a blue green supernatant solution containing most of the soluble materials. This supernatant solution is drawn off and the precipitate washed one or more times with cold water, preferably by agitating the precipitate with the water to suspend the same in the water, allowing the precipitate to settle, and drawing off the water. The water washing is followed by a washing step with $\frac{1}{10}$ normal sulphuric acid which removes some of the copper salts of other amino acids which have also been precipitated. After the acid wash, another final washing with cold water is carried out to substantially completely remove the sulphuric acid.

The precipitate is then suspended in water and hydrogen sulfide introduced into the solution with agitation until the copper is completely precipitated as copper sulfide freeing soluble cysteine hydrochloride. The precipitate is separated by decanting the solution and filtering off the precipitate. The resulting solution is then decolorized with activated charcoal or other decolorizing carbon and again filtered. The clear solution is then evaporated in the absence of air and preferably under reduced pressure to the point of incipient crystallization. Hydrochloric acid may be added to the clear solution before evaporation to insure crystallization of the compound as its hydrochloride. The evaporated solution is then cooled resulting in the formation of crystals of cysteine hydrochloride which may be filtered or otherwise removed from the remaining liquor. The resulting product is relatively pure crystalline hydrochloride.

If necessary or desirable, the product can be further purified by dissolving the crystals in water, again decolorizing and crystallizing, or if an extremely pure product is desired it can be again dissolved in water, reprecipitated with cuprous oxide, subjected to treatment with hydrogen sulfide to precipitate the copper, filtered, decolorized and recrystallized. In the purification steps it may be necessary to add hydrochloric acid to the dilute solution of the desired compound before concentration. The above procedure usually produces a yield of approximately 3 per cent to 5 per cent of cysteine hydrochloride based on the weight of the dried hog hair used in the hydrolysis step.

While the specific example given above has been directed to the recovery of cysteine hydrochloride from hog hair, it is apparent that other material containing cystine, such as hair from other animals, or even human hair, can be employed as a raw material and, furthermore, it is possible to employ other proteinaceous material containing cystine such as ground horn, hooves, shells, etc. It has been found that a relatively small amount of hydrochloric acid is effective to substantially completely hydrolyze the cystine containing material to form the hydrolysate. Thus, in the above example, the actual weight of anhydrous hydrochloric acid employed is equal to approximately 44 per cent of the total proteinaceous material treated with the acid. Depending upon the type of the proteinaceous material, this amount of acid may be varied over a considerable range, for example from 20 per cent up to 100 per cent or more. The concentration of the acid solution may also be varied over a considerable range but is preferably maintained relatively dilute, for example between approximately 15 per cent and 25 per cent concentration.

Although the mixture of solutions and insoluble material from the hydrolysis step is preferably filtered hot to remove insoluble residue from the proteinaceous material while retaining the cystine in solution, it is possible to not filter the material until after the reduction and neutralization step in which case the insoluble proteinaceous material is removed from the neutral solution at low temperatures along with excess insoluble alkaline compound so that the necessity of filtering a hot hydrochloric acid solution, which is extremely corrosive, is avoided, at the expense of some decrease in yield of the cysteine hydrochloride. That is, the presence of the insoluble proteinaceous material during the reduction step appears to cause some decomposition of cysteine. Although powdered limestone, i. e., crude calcium carbonate, is preferred as the neutralizing insoluble alkaline compound, because of its cheapness and availability, it is possible to employ other substantially insoluble alkaline compounds such as magnesium carbonate or magnesium or calcium oxide. It is preferred to neutralize substantially all of the free acid in the solution since the mercaptide precipitated by addition of cuprous oxide is appreciably soluble in even $\frac{1}{10}$ normal hydrochloric acid. The zinc or other reducing metal added in the reduction step to liberate nascent hydrogen combines with a substantial amount of the acid but the amount of metal employed is ordinarily insufficient to combine with all of the acid. It will be appreciated that decantation or other methods of removing insolubles from solutions may be employed for any of the filtration steps of the present process although in general filtration provides most satisfactory separation.

Although zinc is the preferred metal for introduction of hydrogen in the neutralization step, other metals which react with hydrochloric acid to liberate hydrogen, such as tin or iron, can be employed. Most of the other metals, however, have certain disadvantages, for example any tin ions remaining during treatment with cuprous oxide promote conversion of cuprous ions to cupric ions which tend to cause decomposition of the cysteine thus reducing the yield. Also, if iron is employed in the reducing step it should be carefully removed from the solution prior to the precipitation with a cuprous compound because even traces of ferric salts catalyze the oxidation of cysteine back to cystine. Other metals than zinc can, however, be employed if proper precautions are taken.

The reduction step is preferably carried out at approximately 85° C. but this temperature may be varied over a considerable range. It has been found that the temperature should, however, be maintained in excess of 50° C. and somewhat below the boiling point of the solution, for example 95° C.

It has been found that even slight alkalinity of the solution after reduction causes decomposition of the cysteine so that it is impossible to add alkalies in solution thus producing at least local concentration of alkalies. By employing solid alkalies which are almost insoluble in water, even local concentration of alkali is avoided, particularly if neutralization is carried on at low temperature, for example between 0° C. and 20° C., and substantially no decomposition of cysteine is produced. This neutralization step avoids the necessity of removing the acid by such steps as vacuum distillation and more effectively neutralizes the solution than is possible with vacuum distillation.

Cuprous oxide is the preferred material for producing the insoluble mercaptide and reaction with the cuprous oxide goes forward at an increased rate at elevated temperatures. Thus, the reaction is preferably carried out at the boiling point of the solution although lower temperatures can be employed with longer time of treatment. Also cuprous salts can be employed instead of cuprous oxide although such cuprous salts ordinarily liberate acid during the reaction which acid increases the solubility of the resulting mercaptide, thus decreasing the yield. Since the mercaptide is soluble in hot aqueous substantially neutralized solutions and insoluble in cold dilute substantially neutralized solutions, the mercaptide can be precipitated by dilution with cold water. The solution should be substantially neutral as the presence of any acid materially increases the amount of cold water which must be added in order to secure substantially complete precipitation of the mercaptide. Thus, substantially complete precipitation can ordinarily be obtained at temperatures between 0° C. and 20° C. with dilution to between four and ten times the volume. However, if the limestone or other solid alkaline material had not been employed to neutralize the acid dilution, use of a very large volume of cold water would become necessary after reaction with the cuprous compound in order to obtain the precipitate. The supernatant solution after the precipitating step is separated from the precipitate since it contains a considerable amount of soluble compounds. Small amounts of other proteinaceous compounds are also precipitated with the cysteine mercaptide but in general these compounds are more soluble in $\frac{1}{10}$ normal sulphuric acid than the cysteine mercaptide. The light gray precipitate obtained by dilution with cold water is easily separated from the supernatant solution and settling followed by decantation of the solution is effective to produce a satisfactory separation of the precipitate although filtering or other solid separation steps may be employed. The precipitate may be easily washed by suspending it in water and again allowing it to settle, followed by decantation. A washing with $\frac{1}{10}$ normal sulphuric acid following the water washing is effective to remove most of the other proteinaceous compounds which are insoluble in cold water. Thus, the final precipitate is a substantially pure cysteine mercaptide. By again washing the precipitate with water the sulphuric acid is substantially completely removed from the precipitate.

By again suspending the precipitate in water and maintaining it in suspension by agitation while introducing hydrogen sulfide thereinto, the copper is substantially completely removed from the mercaptide to regenerate the cysteine hydrochloride and the copper is substantially completely precipitated as copper sulfide. The copper sulfide precipitate is also relatively easily removed from the solution by filtering or decantation. This precipitate can be washed with water and the resulting washing solution added to the filtrate to recover a slight additional amount of cysteine hydrochloride. Activated charcoal or other decolorizing carbon has been found to be extremely efficient in removing color from the cysteine hydrochloride solution although substantially any other decolorizing adsorbent which is not alkaline in reaction may be employed. The resulting solution of substantially pure cysteine hydrochloride may be concentrated by evaporation of water. Contact with air is preferably prevented during this concentration, particularly if high temperatures are employed and it is preferred to carry out the concentration under vacuum. Hydrochloric acid may be added to the solution before concentration to facilitate the crystallization of the desired compound as its hydrochloride. Upon cooling the cysteine hydrochloride crystallizes out and forms the desired product. If necessary or desirable, this material may be dissolved in water and the decolorization step repeated or the mercaptide precipitation, hydrogen sulfide treatment, and decolorization step may be repeated to further purify the material.

The process as above described should be carried out in non-corrosive equipment which will not introduce metallic ions interfering with the process into the solution by reason of the acids employed therein. Thus, glass or glass lined equipment is entirely satisfactory although most of the steps can be carried out in wooden equipment employing heat resistant glass pipes or tubes for transferring the liquids, for example, the hydrolyzing step may be carried out in cedar tanks or vats employing live steam as a heating medium, which steam may be introduced into the vats by means of heat resisting glass tubes or pipes in order to prevent contact between the hot acid solution and metal. All of the other steps of the process may likewise be carried out in wooden equipment although it is preferred to carry out the concentration step under vacuum in glass or glass lined equipment. Contact of the solution with iron is particularly undesirable, in or after the treatment of the solution with the cuprous compound as ferric ions may be produced which cause oxidation of the cysteine back to cystine thus reducing the yield. As indicated above, the various steps of the process are susceptible to modification but best results have been obtained substantially in accordance with the specific example given above.

While we have disclosed the preferred embodiments of our invention, the details thereof may be varied within the scope of the following claims.

We claim:

1. The process of recovering cysteine, which comprises hydrolyzing a material containing cystine with an aqueous solution of hydrochloric acid, adding a metal selected from the class consisting of zinc, iron, and tin to reduce the cystine containing hydrolysate in the resulting solution to cysteine hydrochloride, neutralizing acid remaining in said solution with a solid alkaline earth compound which is substantially insoluble in said solution, said alkaline earth compound being selected from the class consisting of calcium carbonate, magnesium carbonate, and magnesium oxide, adding cuprous oxide to the solution to precipitate the cysteine hydrochloride as a mercaptide compound insoluble in said neutralized solution at low temperatures to free the same of soluble impurities, and adding hydrogen sulfide to said precipitate to convert said insoluble compound into cysteine hydrochloride.

2. The process of recovering cysteine, which comprises hydrolyzing a material containing cystine with an aqueous solution of hydrochloric acid, adding a metal selected from the class consisting of zinc, iron, and tin to reduce the cystine containing hydrolysate in the resulting solution to cysteine hydrochloride, neutralizing acid remaining in said solution with solid calcium carbonate, adding cuprous oxide to the solution to precipitate the cysteine hydrochloride as a mercaptide compound insoluble in said neutralized solution at low temperatures to free the same of soluble impurities, and adding hydrogen sulfide to said precipitate to convert said insoluble compounds into cysteine hydrochloride by reacting said insoluble cysteine hydrochloride mercaptide compound to remove the metal therefrom in the form of a second insoluble metal compound which will precipitate out while replacing the metal in the cysteine hydrochloride compound with hydrogen.

3. The process of recovering cysteine from materials containing cystine, which comprises hydrolyzing said material with an aqueous solution of hydrochloric acid to form a cystine containing hydrolysate, filtering insoluble material from said hydrolysate and then adding a metal selected from the class consisting of zinc, iron, and tin to reduce the resulting cystine containing hydrolysate with a metal liberating hydrogen in the presence of said acid, thereafter substantially neutralizing acid remaining in said solution with a substantially water insoluble alkaline earth compound so as to prevent rendering said solution alkaline, said alkaline earth compound being selected from the class consisting of calcium carbonate, magnesium carbonate, and magnesium oxide, adding cuprous oxide to the solution to precipitate the cysteine hydrochloride as an insoluble mercaptide compound to separate the same from other materials in said solution, and adding hydrogen sulfide to said precipitate to convert said insoluble compound to cysteine hydrochloride by reacting said insoluble cysteine hydrochloride mercaptide compound to remove the metal therefrom in the form of a second insoluble metal compound which will precipitate out while replacing the metal in the cysteine hydrochloride compound with hydrogen.

4. In the process of recovering cysteine from materials containing cystine, including treating said material with an aqueous mineral acid and reducing cystine in the presence of said acid to form a solution containing a soluble cysteine compound and thereafter precipitating a cysteine mercaptide compound which is insoluble in a substantially neutralized aqueous solution, the steps which comprise adding a metal selected from the class consisting of zinc, iron, and tin to reduce said cystine in the presence of said acid at a temperature between approximately 50° C. and 95° C., and thereafter substantially neutralizing said acid prior to said precipitating with a solid alkali earth compound which is substantially insoluble in said first mentioned solution, said alkaline earth compound being selected from the class consisting of calcium carbonate, magnesium carbonate, and magnesium oxide.

5. The process of recovering cysteine from materials containing cystine, which comprises forming a solution of a cystine containing hydrolysate by treating said material with an aqueous mineral acid, reducing said cystine containing hydrolysate at a temperature between 50° C. and 90° C. with a metal selected from the class consisting of zinc, iron, and tin which reacts with said acid to liberate hydrogen, thereafter substantially neutralizing said solution with a solid alkaline earth compound which is substantially insoluble in said solution and without rendering any portion thereof alkaline, said alkaline earth compound being selected from the class consisting of calcium carbonate, magnesium carbonate, and magnesium oxide, and thereafter precipitating a cysteine mercaptide by adding cuprous oxide which mercaptide is substantially insoluble in a cold dilute neutralized solution from the resulting neutralized solution.

6. The process of recovering cysteine, which comprises hydrolyzing a material containing cystine with an aqueous solution of a mineral acid, adding a metal selected from the class consisting of zinc, iron, and tin to reduce the cystine containing hydrolysate in the resulting solution to a cysteine compound, maintaining the aqueous acid bath at a temperature of from 50° C. to 95° C. while reducing said cystine containing a hydrolysate, neutralizing the acid remaining in said solution with a solid alkaline earth compound which is substantially insoluble in said solution, said alkaline earth compound being selected from the class consisting of calcium carbonate, magnesium carbonate and magnesium oxide, adding cuprous oxide to the solution to precipitate the cysteine compound as a mercaptide compound insoluble at low temperatures to free the same of soluble impurities, and adding hydrogen sulfide to said precipitate to reconvert said insoluble mercaptide compound into the cysteine compound.

7. The process of recovering cysteine, which comprises hydrolyzing a material containing cystine with an aqueous solution of a mineral acid, adding a metal selected from the class consisting of zinc, iron, and tin to reduce the cystine containing hydrolysate in the resulting solution to a cysteine compound, neutralizing the mineral acid remaining in said solution with a solid alkaline earth compound which is substantially insoluble in said solution, said alkaline earth compound being selected from the class consisting of calcium carbonate, magnesium carbonate, and magnesium oxide, adding cuprous oxide to the solution to form a cysteine mercaptide compound, maintaining the solution at a relatively high temperature while reacting the cuprous oxide with the cysteine compound, then lowering the temperature of said solution to cause said mercaptide compound to become insoluble whereby it is precipitated out of the solution, and adding hydrogen sulfide to said precipitate to reconvert said insoluble mercaptide into the cysteine compound by precipitating an insoluble copper sulfide.

DONALD F. HOLLOWAY.
HARLAND H. YOUNG.